(12) United States Patent  
Geffard (10) Patent No.: US 11,541,531 B2  
(45) Date of Patent: Jan. 3, 2023

(54) METHOD FOR CONTROLLING A MANIPULATION ROBOT AND DEVICE IMPLEMENTING SUCH A METHOD

(71) Applicant: COMMISSARIAT A L'ENERGIE ATOMIQUE ET AUX ENERGIES ALTERNATIVES, Paris (FR)

(72) Inventor: Franck Geffard, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 292 days.

(21) Appl. No.: 16/766,391

(22) PCT Filed: Nov. 13, 2018

(86) PCT No.: PCT/EP2018/081132  
§ 371 (c)(1),  
(2) Date: May 22, 2020

(87) PCT Pub. No.: WO2019/101584  
PCT Pub. Date: May 31, 2019

(65) Prior Publication Data  
US 2021/0362322 A1    Nov. 25, 2021

(30) Foreign Application Priority Data  
Nov. 27, 2017  (FR) ...................................... 1761237

(51) Int. Cl.  
*B25J 9/00* (2006.01)  
*B25J 13/00* (2006.01)  
(Continued)

(52) U.S. Cl.  
CPC ........... *B25J 9/0081* (2013.01); *B25J 9/0006* (2013.01); *B25J 13/006* (2013.01); *B25J 13/085* (2013.01); *G06F 3/014* (2013.01)

(58) Field of Classification Search  
CPC ...... B25J 9/0081; B25J 9/0006; B25J 13/006; B25J 13/085; B25J 13/02; G06F 3/014;  
(Continued)

(56) References Cited

U.S. PATENT DOCUMENTS 9,381,645 B1    7/2016 Yarlagadda et al.  
9,607,506 B1 *  3/2017 Manning ................. G06F 1/163  
(Continued)

FOREIGN PATENT DOCUMENTS

WO    2017/178469 A1    10/2017

OTHER PUBLICATIONS

International Search Report for PCT/EP2018/081132 dated Feb. 5, 2019 (PCT/ISA/210).

*Primary Examiner* — Rachid Bendidi  
(74) *Attorney, Agent, or Firm* — Sughrue Mion, PLLC (57) ABSTRACT

A method for controlling a robot (1) for handling a part to be handled (14), the handling robot (1) being linked to a control interface comprising a glove (40) comprising a first finger (41) provided with a first contact sensor (42) and a second finger (43) provided with a second contact sensor (44), the method comprising the following steps; a) associating, in a signal library (25), a first and a second recorded combination of signals (26, 21); b) acquiring a combination of signals originating from the sensors (26, 27) of the glove (40); c) comparing the acquired combination of signals with the recorded combinations (27, 28, 29) in the library (25); d) controlling the handling robot (1) in such a way as to perform a movement according to the velocity vector associated with the acquired combination of signals. A handling glove (40) and handling device implementing the method.

20 Claims, 7 Drawing Sheets

(51) Int. Cl.
*G06F 3/01* (2006.01)
*B25J 13/08* (2006.01)

(58) Field of Classification Search
CPC ..... G06F 3/0202; G06F 3/023; G05B 19/427; G05B 2219/35464; G05B 2219/40305
See application file for complete search history.

(56) References Cited

U.S. PATENT DOCUMENTS

| | | | |
|---|---|---|---|
| 9,996,153 B1* | 6/2018 | Trotta | G06F 3/017 |
| 2008/0052643 A1 | 2/2008 | Ike et al. | |
| 2010/0023314 A1* | 1/2010 | Hernandez-Rebollar | G06V 30/268 |
| | | | 704/E13.001 |
| 2013/0050458 A1 | 2/2013 | Kim et al. | |
| 2016/0246369 A1* | 8/2016 | Osman | A63F 13/212 |
| 2019/0086907 A1* | 3/2019 | Oestergaard | B25J 9/1656 |

* cited by examiner

| | 42 | 44 | 46 | 48 | 50 | 52 | 54 |
|---|---|---|---|---|---|---|---|
| 26 | 0 | o | o | o | o | o | o | |
| 27 | -Vz | o | x | o | o | o | o | [0;0;0] |
| 28 | +Vz | x | o | o | o | o | o | [0;0;0] |
| 29 | +Wz | x | x | o | o | o | o | [0;0;0] |
| 30 | -Wz | x | x | o | o | o | o | [+180;0;0] |
| 31 | -Vx | o | o | o | o | o | x | |
| 32 | +Vx | x | x | x | o | o | o | [-90;0;0] |
| 33 | -Vy | o | x | o | o | o | o | [+90;0;0] |
| 34 | +Vy | o | x | x | o | o | o | [0;0;0] |
| 35 | -Wx | x | x | x | o | o | o | [+180;0;0] |
| 36 | +Wx | x | x | o | o | o | o | [+180;0;0] |
| 37 | -Vz | o | o | x | o | o | x | [0;0;0] |
| 38 | +Vz | o | o | x | o | o | o | [+180;0;0] |
| 39 | -Vz | o | o | x | o | o | o | [+180;0;0] |

| | 42 | 44 | 46 | 48 | 50 | 52 | ... | 54 | | |
|---|---|---|---|---|---|---|---|---|---|---|
| | c1 | c2 | c3 | c4 | c5 | c6 | | q1 | q2 | q3 |
| -Vx | 0±0.1 | 0±0.2 | 0±0.1 | 0±0.3 | 0±0.1 | 0±0.4 | ... | 0±0.1 | 0±0.2 | 0±0.1 |
| -Vx_1 | 0±0.1 | 0.6±0.1 | 0±0.1 | 0±0.3 | 0±0.1 | 0±0.4 | ... | 0±0.1 | 0±0.2 | 0±0.1 |
| +Vx | 0±0.1 | 0.6±0.1 | 0.4±0.1 | 0±0.3 | 0±0.1 | 0±0.4 | ... | 0±0.1 | 0±0.2 | 0±0.1 |
| -Vy | 0±0.1 | 0±0.1 | 0±0.1 | 0±0.3 | 0.9±0.1 | 0.8±0.4 | ... | 0±0.1 | 0±0.2 | 0±0.1 |
| +Vy | 0.8±0.1 | 0.5±0.1 | 0±0.1 | 0±0.3 | 0.0±0.1 | 0.0±0.4 | ... | 0±0.1 | 0±0.2 | 0±0.1 |
| -Vz | 0.8±0.1 | 0.5±0.1 | 0±0.1 | 0±0.3 | 0.0±0.1 | 0.0±0.4 | ... | 0±0.1 | 1.0±0.2 | 0±0.1 |
| +Vz | ... | | | | | | | | | |
| +Vz_1 | ... | | | | | | | | | |
| +Vz_3 | ... | | | | | | | | | |
| -Wx(A) | ... | | | | | | | | | |
| +Wx(A) | ... | | | | | | | | | |
| -Wy(A) | ... | | | | | | | | | |
| +Wy(A) | ... | | | | | | | | | |
| -Wz(A) | ... | | | | | | | | | |
| +Wz(A) | ... | | | | | | | | | |
| -Wy(O) | ... | | | | | | | | | |
| +Wy(O) | ... | | | | | | | | | |
| -Wz(O) | ... | | | | | | | | | |
| +Wz(O) | ... | | | | | | | | | |
| ... | | | | | | | | | | |

Fig. 10

METHOD FOR CONTROLLING A MANIPULATION ROBOT AND DEVICE IMPLEMENTING SUCH A METHOD

CROSS REFERENCE TO RELATED APPLICATIONS

This application is a National Stage of International Application No. PCT/EP2018/081132 filed Nov. 13, 2018, claiming priority based on French Patent Application No. 1761237 filed Nov. 27, 2017.

FIELD OF THE INVENTION

The invention relates to the field of manipulation robots, and more particularly to methods for controlling comanipulation robots.

BACKGROUND OF THE INVENTION

Comanipulation robots allow an operator to manipulate a part directly with the aid of the robot: that is to say, the operator and the robot act jointly on the part.

There are comanipulation robots in which the point of attachment to the robot is equipped with sensors for measuring the forces applied by an operator to the part to be manipulated. Such robots are generally slaved in terms of force in order to displace the part to be manipulated so as to reduce to the point of negation the forces which are applied by the operator to the part to be manipulated. The transmission of the operator's intention is then carried out through the part to be manipulated, the flexibility and geometrical characteristics of which interfere with the acquisition of the operator's intention by the robot. When manipulating a large part, for instance, it is difficult to discriminate a translational movement applied by the operator to the part to be manipulated from a rotational movement. This is the case whether the robot is reversible or equipped with force measuring means. The inertia of the object is also a factor which interferes with the acquisition of the desired movement by the robot (it is necessary to displace the part slightly in order for the sensor to be able to measure anything at all).

There are also robots for which the force measurement is carried out by articular force sensors. The control system is substantially the same, and the difficulties are the same as those described above. These same difficulties are also encountered when the robot is mechanically reversible and when it is then not essential to provide a force measurement a priori.

There are also comanipulation robots whose control comprises a manipulation interface which is located where the operator holds the part to be manipulated and which comprises force and movement sensors. This type of control suffers from instability when the intention is to create a feedback loop, because the transmission of the displacement is carried out through the part to be manipulated. The ambiguity between rotation and translation remains. Lastly, it is necessary to know the distance separating the manipulation interface from the robot, except when being restricted to very simple movements.

The measurement of forces is most often carried out by measuring the deformation of a test object by means of strain gauges, optical sensors, inductive sensors, capacitive sensors or piezoresistive materials.

Comanipulation systems equipped with these sensors exist in some laboratories or in industry, and the controls mentioned above are applied on the basis of measurements obtained from these sensors, either by means of a force loop alone, or by means of position and/or velocity loops in parallel or in series with the force loop (internal or external force control).

In all the control solutions mentioned above, besides the problems of manipulation ambiguity and instability, the precision of the measurement of forces in amplitude and in direction has a direct effect on the quality of the control of the robot (the robot must evade the force in the correct direction and with the correct amplitude), which constrains the selection of measurement solutions, and above all of test objects.

OBJECT OF THE INVENTION

The object of the invention is to provide an intuitive method for controlling a manipulation robot, making it possible to improve the discrimination between various movements that the operator imparts to the part to be manipulated.

SUMMARY OF THE INVENTION

To this end, the invention provides a method for controlling a robot, the robot being connected to a control interface having a glove comprising a first finger provided with a first contact sensor and a second finger provided with a second contact sensor, the method comprising the following steps:

a) during a preparatory step, associating a first and a second recorded combination of signals emitted by the first and second sensors of the glove, respectively with a first setpoint and a second setpoint of the robot, in a signal library;

b) acquiring a combination of signals coming from the sensors of the glove;

c) comparing the acquired combination of signals with the recorded combinations in the library;

d) controlling the robot so that it reaches the setpoint associated with the acquired combination of signals.

A particularly intuitive control method is then obtained, which does not require knowledge of the orientation of the force or the distance separating the operator from the point of connection of the part to be manipulated to the robot in the case of manipulation robots. Since the discrimination between a rotation instruction and a translation instruction is carried out on the basis of a combination of signals, it is straightforward. The control method also makes it possible to be less dependent on the quality of the force measurement and thus potentially to be able to reduce the cost of the system, while maintaining good manipulability of the system.

The control of the manipulation robots is facilitated when the first setpoint and/or the second setpoint is a velocity vector, a displacement or a force.

The number of movements that it is possible to control is increased when the glove comprises a third and/or a fourth and/or a fifth finger respectively provided with a third and/or a fourth and/or a fifth contact sensor, the signal library comprising recorded combinations of signals containing at least one signal of at least one of the third, the fourth and the fifth sensor.

The intuitive nature of the control method is improved significantly when the glove also comprises a contact sensor located on the palm of the glove and/or means for measuring an orientation of the glove. Advantageously, the means for measuring an orientation of the glove comprise an inertial measurement unit.

According to one particularly advantageous embodiment, at least one of the first and second contact sensors comprises a pressure sensor. The intuitive nature of the method is improved when the preparatory step comprises a step of acquiring a first or a second combination of signals coming from the sensors of the glove and a step of acquiring a first or a second velocity vector applied to the manipulation robot. Advantageously, the preparatory step also comprises a step of controlling the manipulation robot so that it reproduces the first or second velocity vector, followed by a step of validating the association of the combination of signals coming from the sensors of the glove with the velocity vector applied to the manipulation robot.

The intuitive nature of the method is further improved when the signal library comprises a plurality of combinations of signals associated with the same velocity vector.

The control method is particularly intuitive when step c) of comparing the acquired combination of signals with the recorded combinations in the signal library comprises an additional step c') of proposing the recorded combination closest to the acquired combination of signals when the acquired combination of signals does not correspond to any of the recorded combinations in the signal library.

The invention also relates to a manipulation glove comprising a first finger provided with a first contact sensor and a second finger provided with a second contact sensor, as well as means for functional connection to a control unit arranged to carry out the method according to the invention.

Advantageously, the means for functional connection to a control unit comprise wireless communication means.

The invention also relates to a manipulation device comprising a robot, a control interface having a manipulation glove and a control unit functionally connected to the manipulation interface and to the robot, the control unit being arranged to carry out the control method according to the invention.

Advantageously, the robot is a manipulation robot.

A device in which the robot is an exoskeleton also offers significant progress in comparison with existing exoskeletons.

Other characteristics and advantages of the invention will emerge on reading the following description of particular embodiments, which do not limit the invention.

BRIEF DESCRIPTION OF THE DRAWINGS

Reference will be made to the appended figures, in which.

DETAILED DESCRIPTION OF THE INVENTION

Figure 1:
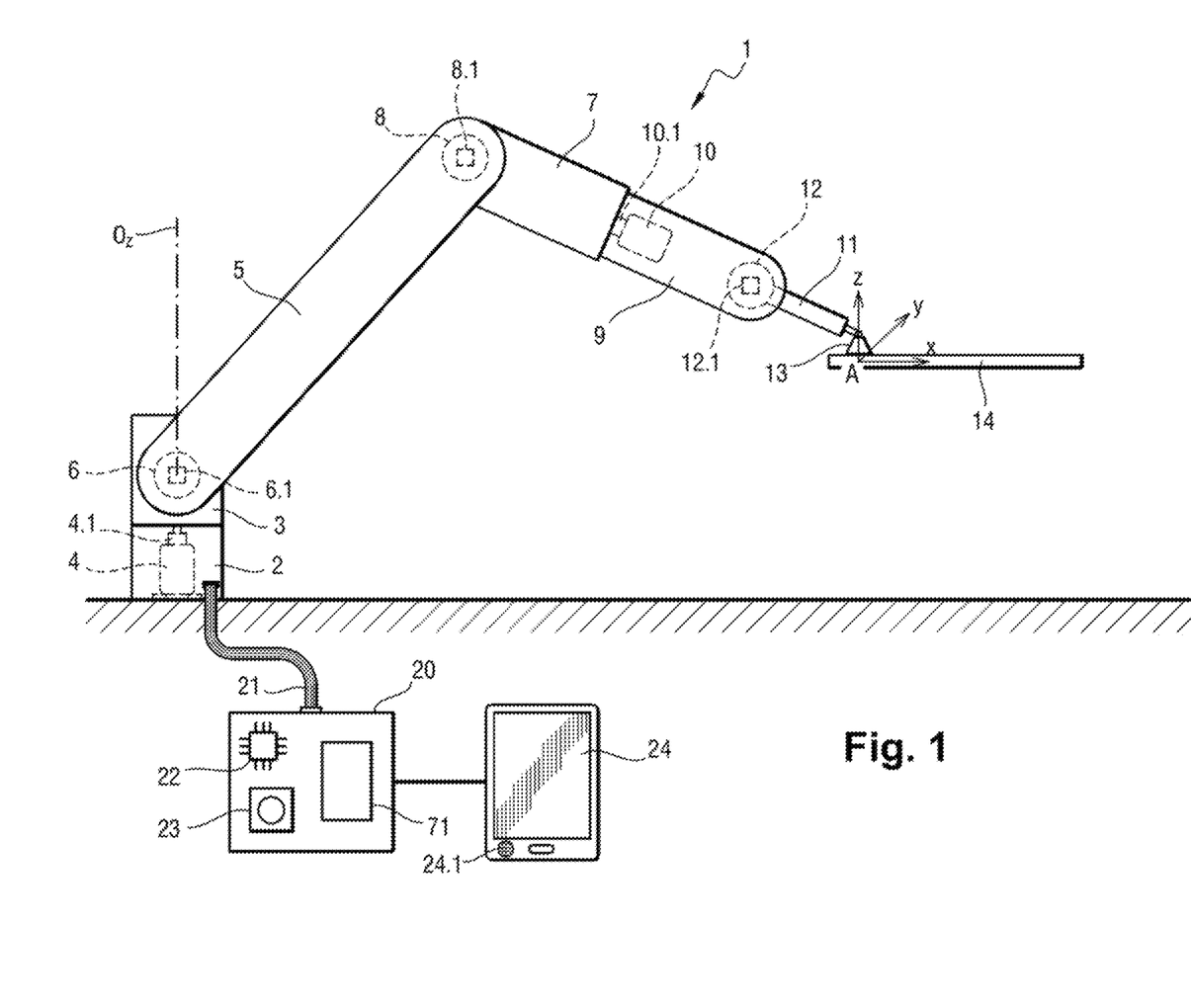
FIG. 1 is a schematic view of a manipulation device according to the invention.

Referring to FIG. 1, the manipulation device according to the invention comprises a manipulation arm 1 with six axes, comprising a chassis 2 which rests on the ground and on which a base 3 of the arm 1 is mounted in rotation about a vertical axis Oz. The rotation of the base 3 is controlled by a first geared motor 4 provided with a first encoder 4.1. A first segment 5 of the arm 1 is articulated on the base 3 about a substantially horizontal axis with the aid of a second geared motor 6 provided with a second encoder 6.1.

A second segment 7 of the arm 1 is articulated on the end 5.1 of the first arm segment 5 about a substantially horizontal axis with the aid of a third geared motor 8 provided with a third encoder 8.1. A third segment 9 of the arm 1 is articulated on the end of the second segment 7 of the arm 1 about the longitudinal axis of the segment 7 with the aid of a fourth geared motor 10 provided with a fourth encoder 10.1. A fourth segment 11 of the arm 1 is articulated on the end of the third segment 9 about an axis perpendicular to the axis of the third segment 9 with the aid of a fifth geared motor 12 provided with a fifth encoder 12.1. The end of the fourth segment 11 is provided with an interface—here a suction cup 13—for gripping a part 14 to be manipulated. An orthonormal reference frame (A, X, Y, Z) is placed at the point A of fastening of the part 14 to the suction cup 13.

The first, second, third, fourth and fifth geared motors 4, 6, 8, 10 and 12 as well as the first, second, third, fourth and fifth encoders 4.1, 6.1, 8.1, 10.1 and 12.1 are connected to a control unit 20 by a ribbon of wires 21. The control unit 20 comprises a processor 22 and a memory 23, and it may also be connected to an interface, for example a touchscreen 24 provided with a microphone 24.1.

Figure 2:
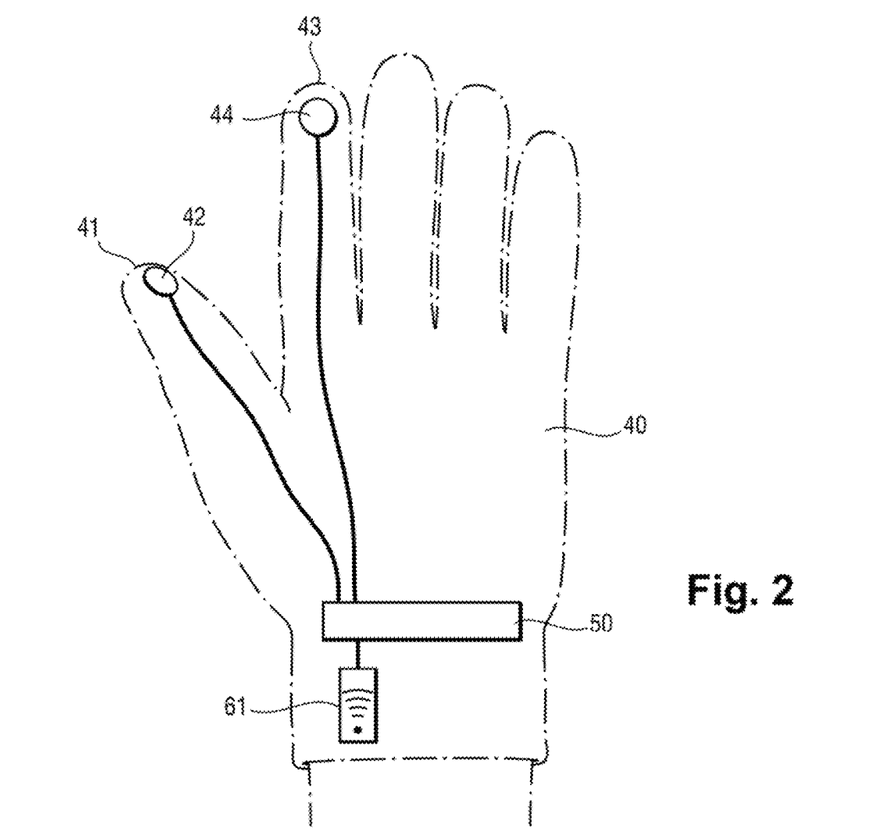
FIG. 2 is a schematic representation of a manipulation glove according to a first embodiment of the invention.

Referring to FIG. 2, an interface 30 for controlling the arm 1 has a manipulation glove 40 comprising a first finger—here the thumb 41—provided with a first resistive pressure sensor 42. The glove 40 also comprises a second finger—here the index finger 43—provided with a second resistive pressure sensor 44. The first sensor 42 and the second sensor 44 are both connected to an acquisition unit 60, which is itself connected to a Bluetooth module 61 for communication with the control unit 20.

Figure 3:
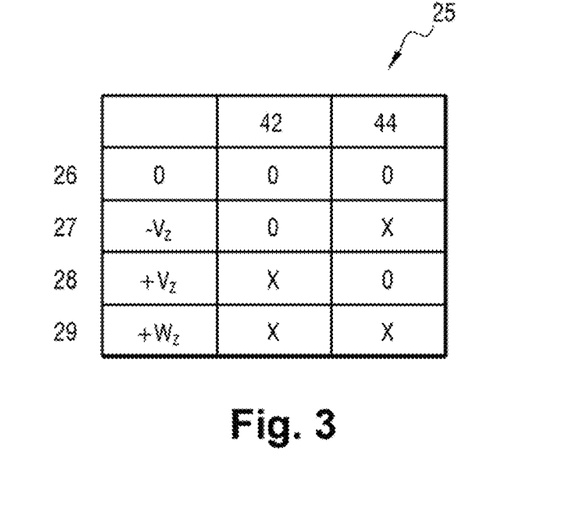
FIG. 3 is a schematic representation of a signal library according to a first embodiment of the invention.

Referring to FIG. 3, the memory 23 of the control unit 20 comprises a library 25 of recorded signals (which is represented schematically here in the form of a table with a plurality of entries). The library 25 in this case comprises four combinations of signals emitted by the first sensor 42 and the second sensor 44, which are respectively associated with four velocity vectors of the arm 1 that are applied at the point A:

- a first combination 26, in which neither of the first and second sensors 42 and 44 emits a signal, and which is associated with a zero velocity vector (no displacement);
- a second combination 27, in which only the second sensor 44 emits a signal and which is associated with a negative velocity vector along the axis AZ;
- a third combination 28, in which only the first sensor 42 emits a signal and which is associated with a positive velocity vector along the axis AZ;
- a fourth combination 29, in which the first and second sensors 42 and 44 both emit a signal and which is associated with a velocity vector having positive rotation about the axis AZ.

In the sense of the present invention, the term library denotes any type of database establishing correspondence between combinations of signals and setpoints (here velocity vectors).

The fields of the signal library 25 may be populated by input or by training. The input may be carried out via the touchscreen 24. The training may be carried out by setting a training mode via the touchscreen 24 and by producing a combination of signals emitted by the first and second sensors 42 and 44 with the aid of the glove 40 (for example by grasping the part 14) then by applying a velocity vector to the part 14. The velocity vector applied by the operator is measured by the first, second, third, fourth and fifth encoders 4.1, 6.1, 8.1, 10.1 and 12.1 of the arm 1 and transmitted to the control unit 20. Once the recording step has been completed, the control unit 20 controls the first, second, third, fourth and fifth geared motors 4, 6, 8, 10 and 12 so that they reproduce the velocity vector measured by the first, second, third, fourth and fifth encoders 4.1, 6.1, 8.1, 10.1 and 12.1 of the arm 1.

If the velocity vector executed by the arm 1 corresponds to the operator's intention, he or she validates the training step with the aid of a verbal confirmation ("OK"), which is picked up by the microphone 24.1 of the touchscreen 24 and is recognized by the control unit 20. The control unit 20 then records the combination of signals emitted by the first and second sensors 42 and 44 in a field of the signal library 25 and associates the measured velocity vector therewith. This operation of association of the combination of signals and the velocity vector is also referred to as "classification" of the signal. When the velocity vector executed by the arm 1 does not correspond to the velocity vector that the operator wishes to associate with the combination of signals which is effected with the aid of the glove 40, the operator cancels the training step with the aid of a verbal confirmation ("NOT OK"), which is picked up by the microphone 24.1 of the touchscreen 24 and is recognized by the control unit 20. The control unit 20 then returns to training mode and enters the recording step. Advantageously, the validation (verbal instruction "OK") may be implicit, and only the cancellation (verbal instruction "NOT OK") will need to be spoken, if the operator wishes to cancel the training step.

In the schematic representations of FIGS. 4, 5, 6 and 9 of the glove 40, a dark circle indicates that the corresponding sensor detects contact, while an empty circle indicates that the associated sensor does not detect any contact.

Figure 4:
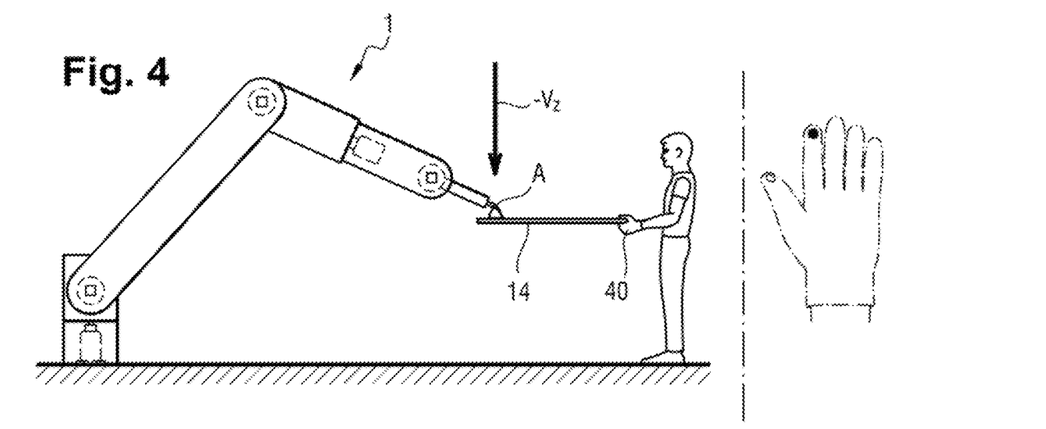
FIGS. 4 to 6 are schematic representations of the manipulation device of FIG. 1 according to various control configurations of the control method according to the invention.

During operation, an operator puts the glove 40 on and presses the index finger 43 of the glove 40 onto the part 14. The second sensor 44 detects a pressure. The combination of signals which corresponds to the activation of only the second sensor 44 is transmitted to the control unit 20 via the Bluetooth module 61. The control unit 20 acquires this combination of signals and compares the combination thus acquired with the first, second, third and fourth combinations 26 to 29 recorded in the library 25. The control unit 20 identifies the acquired combination of signals as corresponding to the second recorded combination 27 and then controls the first, second, third, fourth and fifth geared motors 4, 6, 8, 10 and 12 so that the part 14 carries out a displacement according to a negative velocity vector along the axis AZ. This exemplary case is represented in FIG. 4. This displacement lasts as long as the acquired combination of signals corresponds to the second recorded combination 27. It should be noted that whether the operator applies his or her index finger 43 on the top or bottom of the part 14 (or on one of its sides), and therefore the orientation of the force resulting in the pressure measured by the sensor 44, is irrelevant to the orientation of the velocity vector of the displacement controlled by the control unit 20.

Thus, although the operation of the glove is particularly intuitive (a downwardly directed force applied by the index finger 43 on the top of the part 14 leads to a displacement of the part downward), the control method according to the invention does not require determination of the orientation of the force or the distance separating the operator from the point of connection of the part 14 to be manipulated to the arm 1 in order to identify the operator's intention.

Figure 5:
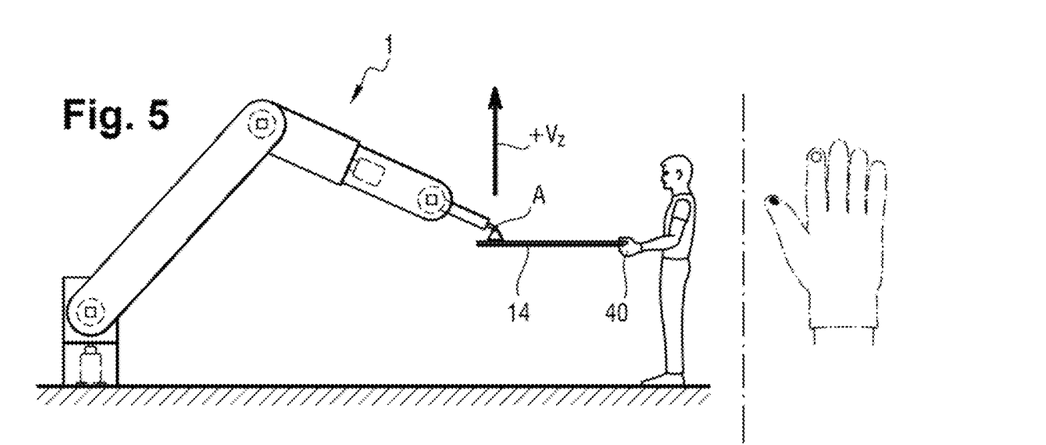

When the operator applies the thumb 41 of the glove 40 onto the part 14, the first sensor 42 detects a contact pressure. The combination of signals which corresponds to the activation of only the first sensor 42 is transmitted to the control unit 20 via the Bluetooth module 61. The control unit 20 acquires this combination of signals and compares the combination thus acquired with the first, second, third and fourth combinations 26 to 29 recorded in the signal library 25. The control unit 20 identifies the acquired combination of signals as corresponding to the third combination 28 and then controls the first, second, third, fourth and fifth geared motors 4, 6, 8, 10 and 12 so that the part 14 carries out a displacement according to a positive velocity vector along the axis AZ. This exemplary case is represented in FIG. 5.

Figure 6:
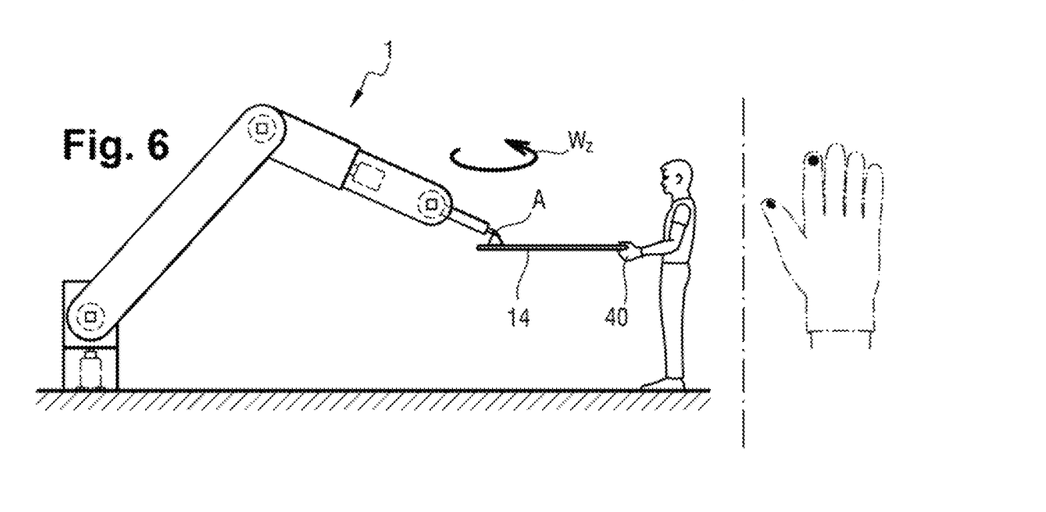

When the operator grasps the part 14 between the index finger 43 and the thumb 41 of the glove 40, the first and second sensors 42 and 44 detect a contact pressure. The combination of signals which corresponds to the activation of the first and second sensors 42 and 44 is transmitted to the control unit 40 via the Bluetooth module 61. The control unit 20 acquires this combination of signals and compares the combination thus acquired with the first, second, third and fourth combinations 26 to 29 recorded in the signal library 25. The control unit 20 identifies the acquired combination of signals as corresponding to the fourth combination 29 and then controls the first, second, third, fourth and fifth geared motors 4, 6, 8, 10 and 12 so that the part 14 carries out a rotation in the positive sense about the axis AZ. This exemplary case is represented in FIG. 6.

A particularly intuitive control method is thus obtained, which does not require knowledge of the distance separating the point of application of the forces onto the part 14 to be manipulated. The control method of the invention makes it possible to discriminate clearly the operator's intention to carry out a rotation or a translation of the part 14 to be manipulated, and to identify the center of rotation about which the rotation of the part 14 to be manipulated is desired (gripping interface, base of the arm 1, or the like) when the combinations of signals have been associated with rotations about different centers of rotation of the part to be manipulated.

Elements which are identical or similar to those described above will be given the same numerical reference as them in the following description of the second and third embodiments of the invention.

Figure 7:
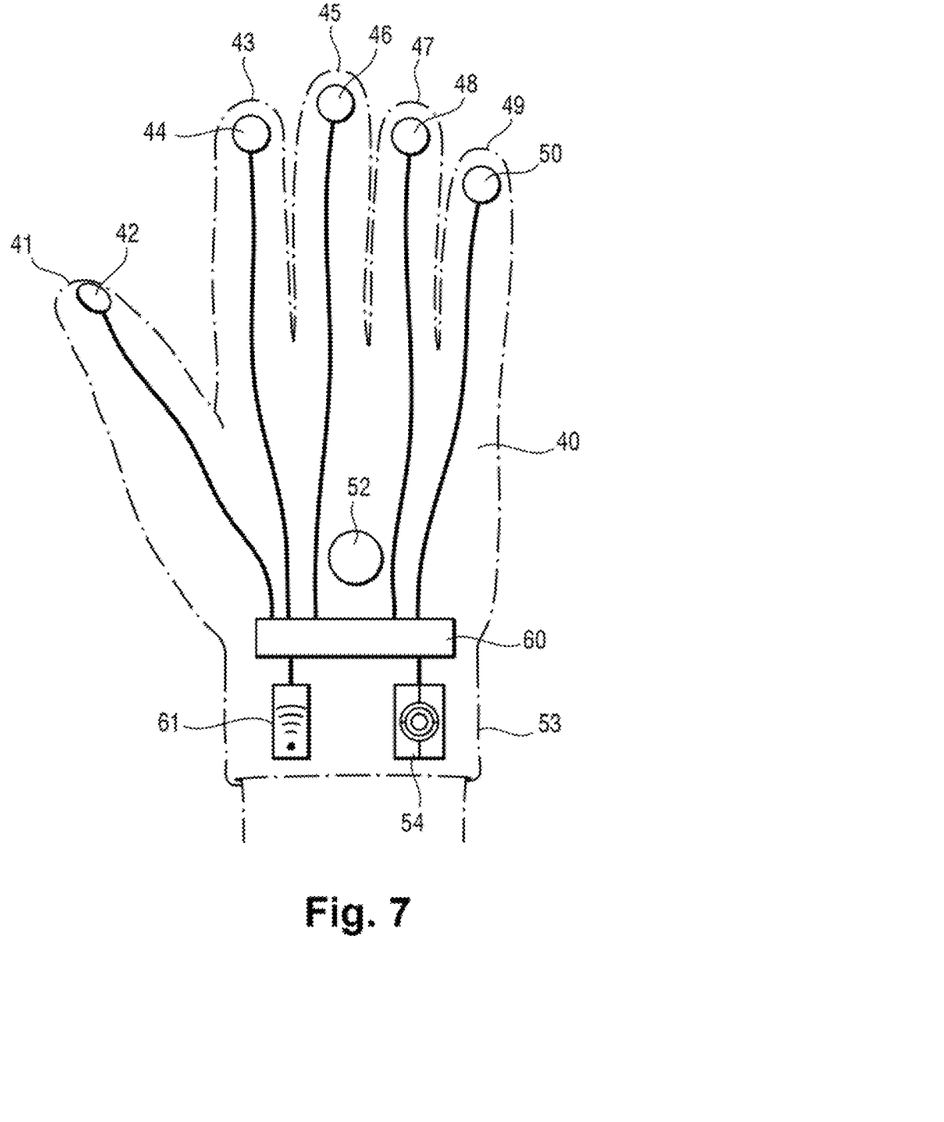
FIG. 7 is a schematic representation of a manipulation glove according to a second embodiment of the invention.
Figure 8:
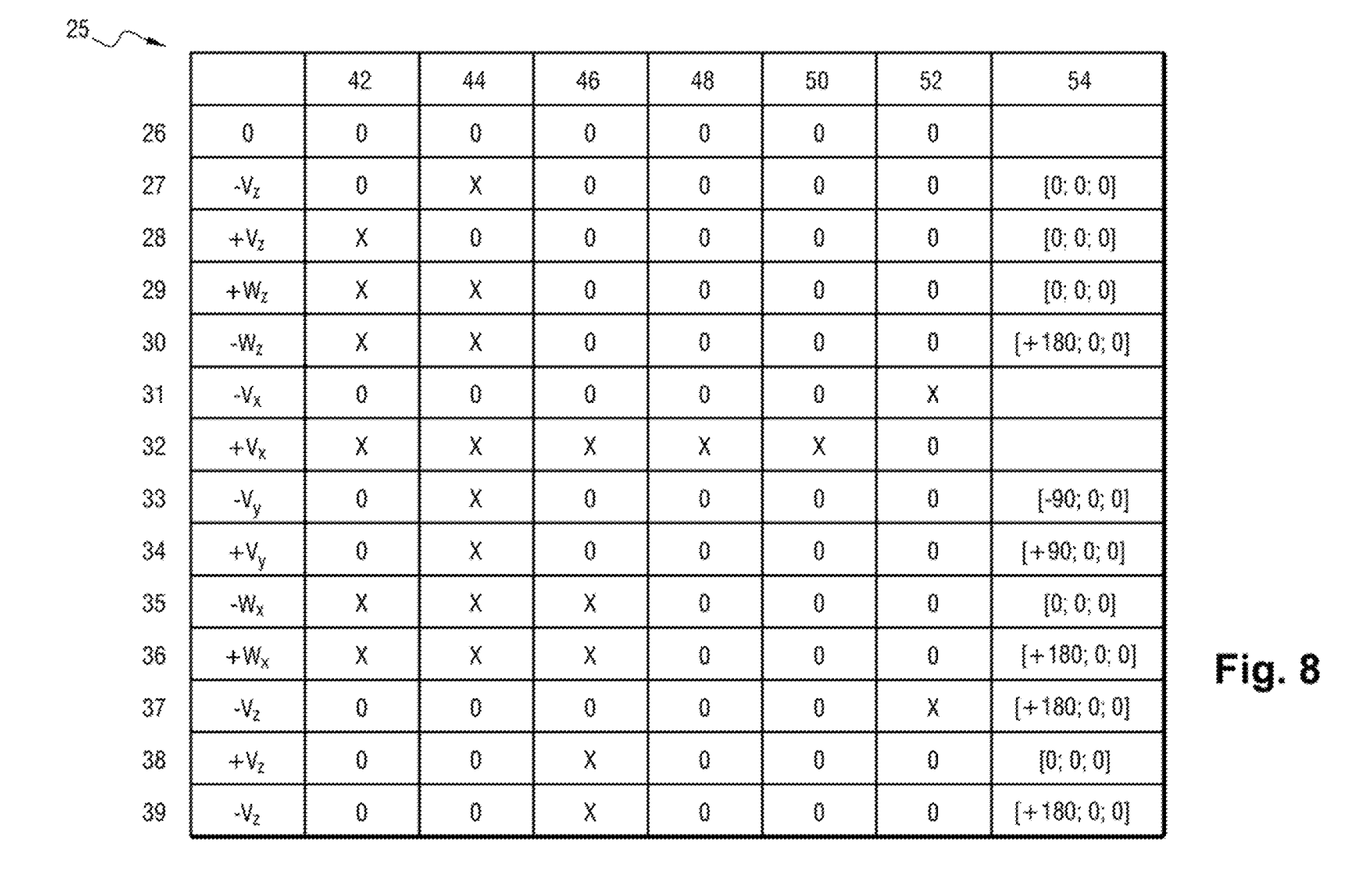
FIG. 8 is a schematic representation of a signal library according to a first embodiment of the invention.

According to a second embodiment of the invention, which is represented in FIGS. 7 and 8, the glove 40 comprises a third, a fourth and a fifth finger 45, 47, 49 respectively provided with a third contact sensor 46, a fourth contact sensor 48 and a fifth contact sensor 50, all connected to the acquisition unit 60. The glove 40 also comprises a sixth contact sensor 52 located on the top of the palm 51 of the glove 40. The wrist 53 of the glove 40 also comprises an inertial measurement unit 54 with gyroscopes and accelerometers. The sixth sensor 52 and the inertial measurement unit 54 are also connected to the acquisition unit 60. The inertial measurement unit 54 delivers triplets of signals, of which the first term 54.1 corresponds to an angle of rotation carried out about the axis OX; the second term 54.2 corresponds to an angle of rotation carried out about the axis OY; the third term 54.3 corresponds to an angle of rotation carried out about the axis OZ.

In this second embodiment of the invention, the signal library 25 comprises recorded combinations of signals containing at least one signal of at least one of the third, fourth, fifth and sixth contact sensors 46, 48, 50 and 52, only some of which is represented in FIG. 8. The signals coming from the inertial measurement unit 54 are thresholded in order to take the following discrete values, in the case of a glove 41 worn on an operator's left hand:

[0, 0,0] degrees (palm of hand upward);
[+90, 0,0] degrees (thumb of left hand upward);
[+180, 0,0] degrees (palm of hand downward);
[−90, 0,0] degrees (thumb of left hand downward).

The recorded combinations of signals 26 to 36 may also incorporate a signal coming from the inertial measurement unit 54. FIG. 8 represents some of the possible recorded combinations of signals 26 to 36. A "0" in a column corresponding to one of the contact sensors 42 to 50 signifies that the corresponding sensor does not emit a signal, while an "X" in a column corresponding to one of the contact sensors 42 to 50 signifies that the corresponding sensor does emit a signal. A "0" in the column corresponding to the inertial measurement unit 54 indicates that the inertial measurement unit 54 measures that the left hand is positioned with the palm upward. A "+90" in the column corresponding to the inertial measurement unit 54 indicates that the inertial measurement unit 54 measures that the left hand is positioned with the thumb upward. A "−90" in the column corresponding to the inertial measurement unit 54 indicates that the inertial measurement unit 54 measures that the left hand is positioned with the thumb downward. A [+180, 0,0] in the column corresponding to the inertial measurement unit 54 indicates that the inertial measurement unit 54 measures that the left hand is positioned with the palm downward. As may be seen in FIG. 8, the signal library 25 also comprises a combination 37 in which the sixth contact sensor 52 emits a signal and the inertial measurement unit 54 indicates that the palm of the hand is oriented downward. The combination 37 is associated with a velocity vector −Vz corresponding to a displacement of the part 14 downward. Another combination 39, in which the third contact sensor 46 emits a signal and the inertial measurement unit 54 indicates that the palm of the hand is oriented downward is also associated with the velocity vector −Vz. The signal library 25 also comprises a combination 38 in which the sixth contact sensor 52 emits a signal and the inertial measurement unit 54 indicates that the palm of the hand is oriented upward. Thus, the signal library 25 comprises three combinations of signals 27, 37 and 39 associated with the same velocity vector −Vz. This plurality of combinations associated with the same velocity vector makes it possible to improve the intuitive nature of the control method by allowing a downward pressure exerted on the part 14 with the aid of the index finger (combination 27), the palm of the hand (combination 37) or the middle finger (combination 39) controls the arm 1 so that the part 14 is displaced according to the velocity vector −Vz.

During operation, the control unit 20 acquires a combination of signals coming from the first, second, third, fourth, fifth and sixth contact sensors 42, 44, 46, 48, 50 and 52, as well as coming from the inertial measurement unit 54. For purposes of illustration, the control unit 20 acquires a combination of signals 70 in which the first and second sensors 42 and 44 emit a signal and none of the other sensors emits a signal, the inertial measurement unit indicating "[0, 0,0]" (palm of the hand upward). The control unit 20 then compares the acquired combination of signals 70 with the combinations 26 to 39 recorded in the library 25, and identifies that the acquired combination of signals 70 corresponds to the recorded combination of signals 29. The control unit 20 then controls the first, second, third, fourth and fifth geared motors 4, 6, 8, 10 and 12 so that the part 14 carries out a rotation about the axis AZ in the positive sense, which corresponds to the velocity vector associated with the recorded combination of signals 29.

Figure 9:
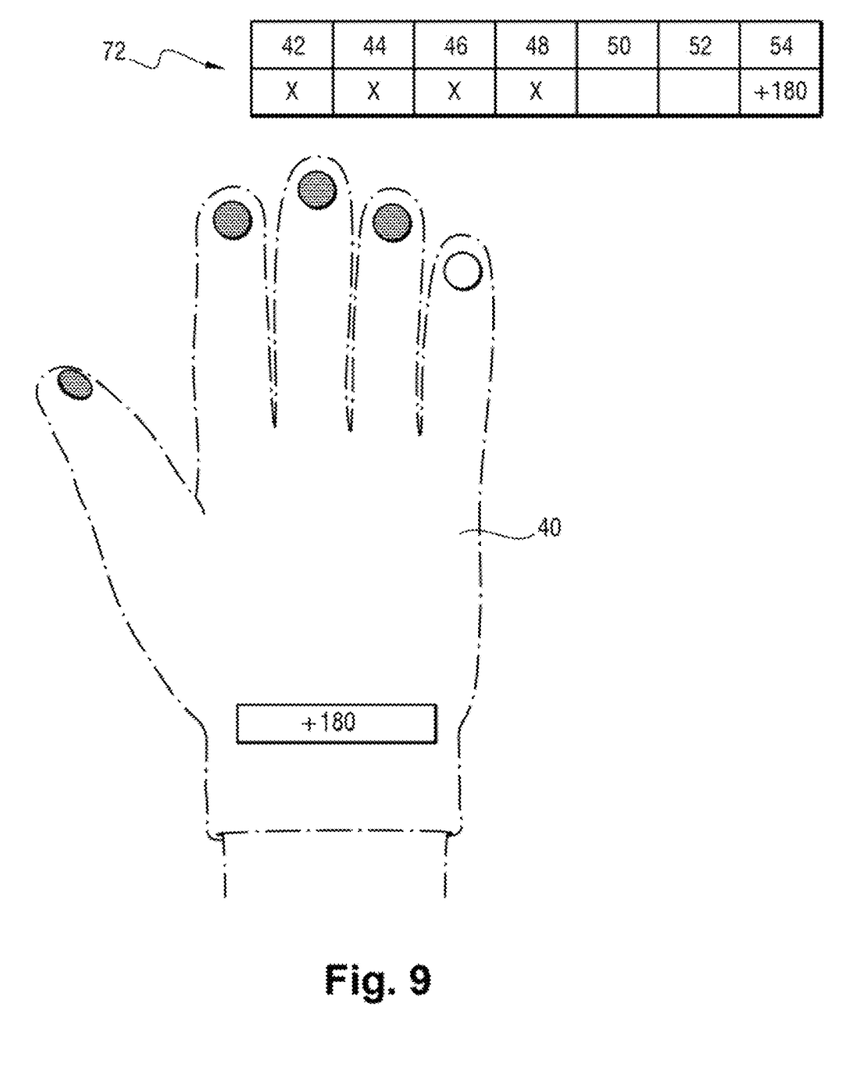
FIG. 9 is a schematic representation of a particular configuration of the manipulation glove according to a third embodiment of the invention.

According to a third particular embodiment, which is represented in FIG. 9, the control unit 20 comprises an artificial intelligence module 71 arranged to establish matching scores between an acquired combination of signals and the recorded combinations of signals 26 to 39 in the library 25. When an acquired combination 72 of signals—here for example an acquired combination 72 of signals in which the first, second, third and fourth sensors 42, 44, 46 and 48 emit signals and the inertial measurement unit 54 indicates "[+180, 0,0]", i.e. the palm of the hand is downward, the control unit 20 compares the acquired combination of signals 72 and the recorded combinations of signals 26 to 39 in the library 25. Since the control unit 20 does not find a correspondence between the acquired combination of signals 72 and the recorded combinations of signals 26 to 39 in the library 25, the control unit 20 then carries out an additional step of establishing matching scores between the acquired combination of signals 72 and the recorded combinations of signals 26 to 39 in the library 25. The control unit then selects the recorded combination 26 to 39 whose score of correspondence (distance, probability, etc.) with the acquired combination of signals 72 is greater than a preset first threshold—here the recorded combination 36—and then proposes to the operator via the touchscreen 24 to carry out the velocity vector associated with the recorded combination of signals 36. If the proposed velocity vector—here a rotation about the axis AX in the positive sense—corresponds to the operator's intention, he or she validates the proposal with the aid of a voice instruction "OK", which is picked up by the microphone 24.1 of the touchscreen 24 and is recognized by the control unit 20. The control unit 20 then controls the first, second, third, fourth and fifth geared motors 4, 6, 8, 10 and 12 so that the part 14 carries out a rotation about the axis AX in the positive sense.

If the proposed velocity vector—here a rotation about the axis AX in the positive sense—does not correspond to the operator's intention, he or she rejects the proposal with the aid of a voice instruction "NOT OK", which is picked up by the microphone 24.1 of the touchscreen 24 and is recognized by the control unit 20. According to a first variant of the third embodiment, the control unit 20 excludes the combination of signals 36 and starts a new operation of selecting a recorded combination 26 to 35 and 37 to 39 whose score of correspondence (distance, probability, etc.) with the combination of signals 72 is greater than a preset second threshold, which is lower than the preset first threshold. This new combination is proposed to the operator, who may decline it or accept it, according to the features described above.

According to a second variant of the third embodiment, the control unit 20 proposes to record the combination 72 in the library 25 and also to associate it with the velocity vector 36. The operator may decline or accept the recording, according to the features described above.

The control method may be further improved if, during the training step a) or during the recognition step c), it is possible to eliminate a signal-combination/velocity-vector pairing. The control method may also be improved by addition of adaptive laws based on probabilistic criteria or of thresholds, thus allowing semisupervised training that allows the detection step to be made more robust.

Figure 10:
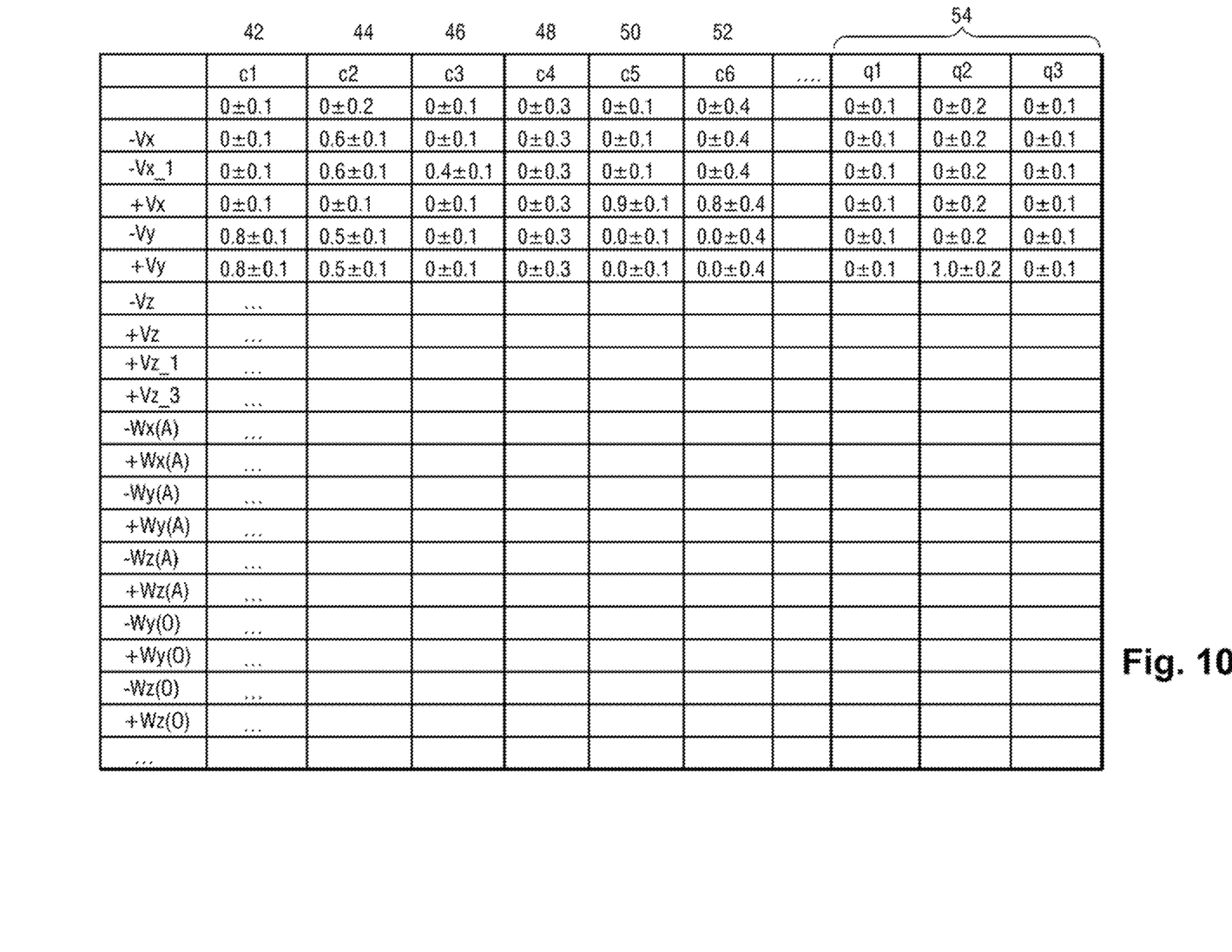
FIG. 10 is a schematic representation of a signal library according to a fourth embodiment of the invention.

According to a fourth embodiment, the measurements carried out by the first pressure sensor 42, the second pressure sensor 46, the third pressure sensor 48, the fourth pressure sensor 50 and the fifth pressure sensor 52 are treated as analog measurements (and not as all-or-nothing as in the previous embodiments). Thus, during the preparatory step a) and the comparison step c), the control unit 20 receives quantized real numbers (analog values), here with a resolution of 12 bits. The control unit 20 then implements suitable algorithms—inter alia neural networks, hidden Markov models, vast margin separators, k-means, GMM, etc.) and/or includes in particular a step of filtering the various signals, weightings, as well as probabilistic identification criteria or ones based on simple thresholds. These tools make it possible to discriminate an actual contact intention from noise or a drift of the sensor. According to this fourth embodiment, the fields of the signal library 25 then comprise values to which tolerance ranges are attached.

According to the fifth embodiment, the pressure level may be used in order to vary the magnitude of the velocity vector to be applied to the part 14 to be manipulated. It is also possible to vary the magnitude of the velocity vector or the acceleration to be applied to the part to be manipulated according to the duration for which the combination of signals is applied.

The invention is not of course limited to the embodiments described, but covers any variant falling within the scope of the invention as defined by the claims.

In particular,
- although in this case the method is described for application to the control of a manipulation arm with six axes, the invention also applies to other types of manipulation robot, for example an overhead crane, a mobile crane, an arm comprising a different number of articulations and/or segments;
- although in this case the manipulation robot comprises a suction cup for gripping the part to be manipulated, the invention also applies to other means for connecting the manipulation robot to a part to be manipulated, for example a hook, a clamp, a magnet or a screw connection;
- although in this case the control unit is connected to the manipulation robot by a ribbon of wires, the invention also applies to other means for functional connection of the control unit to the manipulation robot, for example a connection with the aid of an EtherCAT bus, CAN, Profibus, Ethernet, an optical fiber, a Wi-Fi connection or Bluetooth;
- although in this case the manipulation glove comprises five fingers, the invention also applies to other types of control interface, for example a control interface comprising a glove with two, three or four fingers. In the context of the present application, a glove is a support intended to be worn by an operator's hand. Thus, one or more finger pieces carrying the sensors are included among objects referred to by the term "glove" in the context of the application;
- although the control unit is in this case connected to the sensors of the manipulation glove by means of a Bluetooth module, the invention also applies to other means for functional connection of the control interface to the control unit, for example a connection with wires, by optical fiber, or wireless according to protocols such as Wi-Fi or radio;
- although in this case the control unit comprises a processor, the invention also applies to other computational means, for example a microcontroller, logic gates or an FPGA;
- although in this case the control unit is connected to a touchscreen, the invention also applies to other types of interface, for example a keyboard and/or a joystick associated with a screen or voice control, or by eye tracker (blinking) or pressure on a finger, or any other tool which thus avoids the operator leaving their workstation;
- although in this case the glove comprises resistive pressure sensors, the invention also applies to other types of contact sensors, for example capacitive, inductive, photoelectric or ultrasonic sensors, or switches;
- although in this case the library comprises between four and thirteen combinations of signals, the invention also applies to a signal library comprising fewer than four combinations of signals, for example two, or more than thirteen;
- although in this case the operator directly manipulates the part to be manipulated by the robot, the invention also applies to indirect manipulation, in which the operator manipulates a graphical representation of the part to be manipulated;
- although an initial measurement unit is in this case located on the wrist part of the glove, the invention also applies to other types of means for measuring an orientation of the glove, for example an inertial measurement unit with resonance gyrometers or with bubbles, or an optical system such as cameras or infrared sensors;
- although an initial measurement unit is in this case located on the wrist part of the glove, the invention also applies to other installations of the means for measuring an orientation of the glove, for example on the back of the hand, on one of the fingers, or on the forearm of the operator;
- although in this case the glove comprises between two and six pressure sensors, the invention also applies to a glove having many more pressure sensors, or other types of sensors, for example finger flexion sensors or infrared localization sensors;
- although in this case a single glove is used, the invention also applies to a control interface having a plurality of gloves, for example an operator wearing two gloves or even several operators wearing one or more gloves and manipulating the same object;
- although in this case the center about which the part to be manipulated carries out a rotation is located at the gripping interface of the manipulation robot, the invention also applies to other centers of rotation, located at other positions on the object or even outside the object to be manipulated;
- although in this case the operation has been described with a representation of the rotation of the glove and/or of the part to be manipulated in the form of Euler angles about axes of an orthonormal reference frame connected with the manipulation robot, the invention also applies to other representations of the rotations, example quaternions, the Rodrigues representation, all or part of the rotation matrix, or other Euler angles (for example roll, pitch, yaw, etc.). The rotations will advantageously be represented in a reference frame connected with the part to be manipulated or with the terminal member of the robot;

although in this case the movements associated with the combinations of signals are Cartesian velocity vectors, the invention also applies to other types of associated movements, for example articular velocities or Cartesian or articular forces, or Cartesian or articular positions, or Cartesian or articular trajectories;

although in this case the velocity vectors applied to the part to be manipulated are described in a Cartesian fashion in an orthonormal reference frame connected with the manipulation robot (VZ, VY, etc.), the invention advantageously applies to other types of representations of the velocity vectors to be applied to the part to be manipulated, for example velocity vectors to be applied in the reference frame of the object or of the gripping interface or in another reference frame;

although in this case the glove comprises a sixth contact sensor on the top of the palm, the invention also applies to other installations of the sixth sensor on the palm of the glove, for example installation on the thenar eminence of the palm, or a plurality of sensors on the palm;

although in this case the validation or cancellation of the training step is carried out with the aid of a verbal confirmation picked up by a microphone, the invention also applies to other means for validating or cancelling the training step, for example pressing a button or a combination of signals coming from the glove. Advantageously, the validation or cancellation is carried out with the aid of an action by the operator not requiring him or her to release the part to be manipulated or leave his or her workstation, for example the detection of a head movement or blinking of the eyes, detected with the aid of a camera connected to the control unit;

although in this case the combinations of signals are associated with velocity vectors, the invention also applies to other types of setpoints for the robot, for example a displacement, trajectory, force or acceleration setpoint;

although in this case the robot is a manipulation robot, the invention also applies to other types of robot, for example an ambulatory or nonambulatory exoskeleton, in which the signal library associates combinations with setpoints intended for the various actuators of the exoskeleton, for example the arm and/or leg actuators.

The invention claimed is:

1. A method for controlling a robot, the robot being connected to a control interface having a glove comprising a first finger provided with a first contact sensor and a second finger provided with a second contact sensor, the method comprising the following steps:
   a) during a preparatory step, associating a first recorded combination of signals emitted by the first and second contact sensors of the glove with a first setpoint and associating a second recorded combination of signals emitted by the first and second contact sensors of the glove with a second setpoint of the robot, in a signal library;
   b) acquiring a combination of signals coming from the first and second contact sensors of the glove;
   c) comparing the acquired combination of signals with the recorded combinations in the library;
   d) controlling the robot so that the robot reaches the setpoint associated with the acquired combination of signals,
   step c) of comparing the acquired combination of signals with the recorded combinations in the signal library comprising an additional step c') of proposing a recorded combination of signals closest to the acquired combination of signals when the acquired combination of signals does not correspond to any of the recorded combinations in the signal library.

2. The control method as claimed in claim 1, wherein the first setpoint and/or the second setpoint is a velocity vector.

3. The control method as claimed in claim 1, wherein the first setpoint and/or the second setpoint is a displacement.

4. The control method as claimed in claim 1, wherein the first setpoint and/or the second setpoint is a force.

5. The control method as claimed in claim 1, wherein the glove comprises a third and/or a fourth and/or a fifth finger respectively provided with a third and/or a fourth and/or a fifth contact sensor, the signal library comprising recorded combinations of signals containing at least one signal of at least one of the third and/or the fourth and/or the fifth contact sensor.

6. The control method as claimed in claim 1, wherein the glove also comprises a contact sensor located on a palm of the glove.

7. The control method as claimed in claim 1, wherein the glove also comprises means for measuring an orientation of the glove.

8. The control method as claimed in claim 7, wherein the means for measuring an orientation of the glove comprise an inertial measurement unit.

9. The control method as claimed in claim 1, wherein at least one of the contact sensors comprises a pressure sensor.

10. The control method as claimed in claim 1, wherein the signal library comprises a plurality of combinations of signals associated with the same setpoint.

11. The control method as claimed in claim 1, wherein the preparatory step comprises:
   a step of acquiring:
      a first combination of signals coming from the contact sensors of the glove to record the first recorded combination of signals, or
      a second combination of signals coming from the contact sensors of the glove to record the second recorded combination of signals, and
   a step of acquiring the first setpoint applied to the robot or the second setpoint applied to the robot.

12. The control method as claimed in claim 11, wherein the preparatory step comprises a step of controlling the robot so that it reproduces the first or second setpoint, followed by a step of validating the association of the combination of signals coming from the contact sensors of the glove with the setpoint applied to the robot.

13. A device comprising a robot, a control interface having a manipulation glove, the manipulation glove comprising means for functional connection to a control unit, the control unit functionally being connected to the control interface and to the robot, the control unit being arranged to carry out the control method.

14. The device as claimed in claim 13, wherein the robot is a manipulation robot.

15. The device as claimed in claim 13, wherein the robot is an exoskeleton.

16. The device as claimed in claim 13, wherein the manipulation glove comprises a third and/or a fourth and/or a fifth finger respectively provided with a third and/or a fourth and/or a fifth contact sensor, and/or a contact sensor located on a palm of the glove and/or an inertial measurement unit.

17. The manipulation glove as claimed in claim 13, wherein the means for functional connection to a control unit comprise wireless communication means.

18. A manipulation glove comprising means for functional connection to a control unit arranged to carry out the method as claimed in claim 1.

19. The manipulation glove as claimed in claim 18, comprising a third and/or a fourth and/or a fifth finger respectively provided with a third and/or a fourth and/or a fifth contact sensor, and/or a contact sensor located on a palm of the glove and/or an inertial measurement unit.

20. The manipulation glove as claimed in claim 18, wherein the means for functional connection to a control unit comprise wireless communication means.

\* \* \* \* \*